United States Patent [19]

Hauge

[11] 4,073,753

[45] Feb. 14, 1978

[54] OUTDOOR SURFACE COMPOSITIONS

[76] Inventor: Stein Hauge, P.O. Box 462, Mercer Island, Wash. 98040

[21] Appl. No.: 566,034

[22] Filed: Apr. 7, 1975

[51] Int. Cl.$^2$ .................. C08J 11/04; C08K 7/18; C08K 3/34
[52] U.S. Cl. .................. 260/2.3; 260/42.25; 260/42.29; 260/42.37; 260/42.47; 260/710; 404/32
[58] Field of Search .................. 260/2.3, 42.29, 42.37, 260/42.47, 710; 404/32

[56] References Cited

U.S. PATENT DOCUMENTS

| 2,871,774 | 2/1959 | Johnson | 264/31 X |
|---|---|---|---|
| 3,640,912 | 2/1972 | Reinhard et al. | 260/2.3 |
| 3,801,421 | 4/1974 | Allen et al. | 260/2.3 X |

FOREIGN PATENT DOCUMENTS 443,148  2/1936  United Kingdom.

*Primary Examiner*—Walter C. Danison
*Attorney, Agent, or Firm*—Seed, Berry, Vernon & Baynham

[57] ABSTRACT

An outdoor surface composition for surfacing outdoor playing areas or other utility areas comprises a mixture of particulate reclaimed rubber and inorganic particulate solids, such as sand, mixed together and compacted in a particular weight ratio, with each of the components having a designated particle size range. The amount and particle size range of both the reclaimed rubber and the inorganic particulate solids are important in obtaining a composition which is water-pervious for adequate drainage, shock absorbent, resistant to shear under average athletic playing conditions, and compaction resistant. For some applications, organic particulate solids, such as wood chips, peat, manure or cinders, may be included with the composition.

7 Claims, No Drawings

OUTDOOR SURFACE COMPOSITIONS

BACKGROUND OF THE INVENTION

1. Field of the Invention

This invention relates to a composition for surfacing outdoor playing areas and/or other utility areas and to a method of laying such.

2. Prior Art Relating to the Disclosure

Outdoor natural playing surfaces for children and for athletics pose maintenance problems associated with their use for correction of drainage and compaction problems. Natural playing surfaces tend to be dusty during dry weather and are not suitable for play during wet weather or when frost is coming out of the ground. An inexpensive, all-year, all-use playing surface is needed.

Numerous materials have been tried to develop a playing surface to solve this problem. Among the materials tried are rock asphalt, cutback tar, hot mix asphalt, asphaltic oil with sawdust, stone chips, spruce shavings, premixed asphalt laid cold, sawdust-soil mixtures, resilient asphaltrubber surfaces such as described in U.S. Pat. Nos. 2,863,431 and 2,871,774. All of these materials have certain advantages over a natural soil surface because they require low maintenance and can be generally used throughout the year, during good as well as inclement weather. The disadvantages of such surfaces, however, are in severe surface runoff problems, abrasive surfaces resulting in high accident frequency and retardation of motor ability development in young children by discouraging their running, jumping, falling, rolling and crawling without considerable discomfort, lack of resiliency, slippery, hot or solt in summer, and the tendency to soil and wear children's clothing.

The qualities desired in a play surface include resilience, good drainage, freedom from dust, durability, non-abrasiveness, cleanliness, firmness, smoothness, general utility, good appearance, reasonable initial and maintenance cost, and for athletic purposes, good traction. It has been difficult to find a composition which combines all of these qualities for varying climatic conditions.

SUMMARY OF THE INVENTION

It is a primary object of this invention to provide a composition for surfacing outdoor playing areas and/or other utility areas which combines many of the desirable properties needed in a play surface, the composition comprising a mixture of particulate rubber and particulate inorganic solids.

It is a further object of this invention to provide a composition comprising a mixture of particulate rubber and particulate inorganic solids mixed together in particular amounts with the rubber and inorganic solids having a relatively critical particle size range, the composition insuring a surface which (1) is sufficiently water-pervious to provide adequate drainage therethrough, (2) has good traction for athletics because of its resistance to shear, (3) has good shock absorption characteristics at maximum compaction, (4) reduces the injury rate due to falls because of its resiliency and shock absorption characteristics, (5) has general utility and good appearance, and (6) has reasonable initial and maintenance cost.

It is a further object of this invention to provide a composition as described above which can be planted to turf, the composition preventing leaching of nutrients as occurs in sandy soil alone.

It is a further object of this invention to provide a composition designed for cleanliness and workability, particularly for use around play equipment and in play areas for group or individual play.

It is a further object of this invention to provide a composition of granulated particulate rubber and particulate inorganic solids as a garden soil for all seasons.

These and other objects are accomplished by providing a composition consisting essentially of 10–50% by volume particulate rubber having a particle size such that all passes a No. 8 sieve and not more than 10% by volume passes a No. 100 sieve, and 90–50% by volume inorganic particulate matter having a particle size such that 80–100% passes a No. 8 sieve and not more than 15% passes a No. 200 sieve. The composition, when integrally blended, laid over an outdoor area and compacted to a depth of at least two inches, provides a surface which is resilient, water-pervious, shock absorbent, natural in appearance, durable and low in abrasion.

DESCRIPTION OF THE PREFERRED EMBODIMENTS

The inorganic particulate matter which may be used in formulating this composition should have a particle size such that 80–100% by volume of the solid passes a No. 8 sieve and not more than 15% by volume passes a No. 200 sieve. Suitable inorganic solids include sand, vermiculite or other like materials along or in admixture or mixed with organics, such as wood chips, cinders, peat, etc.

The particulate rubber compound used in the mixture should have a particle size such that not more than 10% of the particulate rubber passes a No. 100 sieve and all passes through a No. 8 sieve. Rubber which is generally used is rubber reclaimed from automobile or other vehicle tires which has been shredded to particles or to a fiber, with the fibers ranging in length from ¼ to 3 inches and not greater than ⅛ inch in width. Rubber materials which may be used other than particulate rubber obtained from reclaimed tires include, in general, any natural or synthetic rubber materials, such as fluorinated rubber, styrene-butadiene rubber, butyl rubber, neoprene rubber, nitrile rubber, urethane rubber, ethylenepropylene polymers, acrylic polymers, epichlorohydrin polymers, silicone polymers, polysulfide polymers and polypropylene oxide polymers.

The rubber component and inorganic solids component are mixed together to obtain a uniform blend. If desired, organics can be mixed in with the inorganic solids and rubber to formulate a blend suitable for garden soils or for a composition useful beneath play equipment.

The amount of each of the components should range from 10–50% by volume particulate rubber and 90–50% by volume inorganic particulate solids. Preferably, the amounts range from 40–50% by volume rubber and 60–50% by volume inorganic particulate solids, both components being within the particle size range previously described. If too great an amount of rubber or inorganic particulate matter is added to the blend, the mixture tends to segregate over a period of time. The mixture loses compaction capability and tends to shear if too much rubber is incorporated in the mixture. When organics are utilized, they may constitute 5–25% by volume along with 20-30% by volume particulate rubber and 75-45% by volume particulate inorganic solids.

Once the mixture is blended, it is laid over the area to be surfaced to an average depth of from 2 to 6 inches, the depth depending on the nature of the substrate. For a sandy substrate, two inches may be sufficient, whereas, for a rocky or clay substrate, 6 to 9 inches or more may be necessary.

This rubber-inorganic solids composition is primarily used as a surface composition for playfields and athletic fields. The composition of rubber and inorganic solids further mixed with wood chips, for example, makes a good surfacing for play areas, particularly beneath play apparatus for young children. In this instance, the inorganic particulate solids, particulate rubber and wood chips may be mixed together in equal amounts. Such a composition provides good drainage, good footing and resiliency, but does not have the traction characteristics of the composition of rubber and inorganic solids primarily useful as a surface composition for playfields and athletic fields. A fine blend of sand and particulate rubber in the amounts previously specified, without organics, makes an ideal composition for young children to play in. It induces imagination, creative and safe play for groups or individuals and can be formulated into three-dimensional shapes for play purposes. The particle sizes and ratio of components are particularly critical where the composition is used to surface playing fields and/or athletic areas in order to obtain the requisite traction, resistance to shear, shock absorption and drainage. For other applications, these properties may not be as critical.

Other applications of the surfacing composition include agricultural and/or planting soil, surfacing for recreational trails, golf course greens, etc.

EXAMPLE I

A blend of sand having the following blended sieve analysis, 70% by volume, was uniformly blended with shredded reclaimed rubber, 30% by volume. The rubber was of the type produced from reclaimed vehicle tires by a rasping process and was made up of rubber particles 1 to 2 inches in length and 1/16 to ⅛ in diameter. The sand blend had the following sieve analysis.

| Screen | % Pass |
| --- | --- |
| #4 | 100% |
| #8 | 90.1% |
| #20 | 67.6% |
| #24 | 62.8% |
| #30 | 57.3% |
| #50 | 42.9% |
| #100 | 37.6% |
| #200 | 8.3% |

Once the composition was uniformly blended, it was laid over the play surface area to an average depth of 4 to 6 inches. The playing field was at the Ivanhoe Elementary School in the Bellevue School District of Bellevue, Washington.

The field had good drainage and a distinct lack of abrasive material. Abrasion of knees, hands and elbows occurred less than with playing surfaces previously used. Soccer coaches, in observing players playing on the surface, felt that the players were more aggressive and more likely to dive for the ball than on other surfaces.

EXAMPLE II

A dark brown silty sand with organics incorporated therein having the following sieve analysis, 80% by volume, was mixed with shredded rubber, 20% by volume.

| Sieve | % Pass |
| --- | --- |
| ½ | 100% |
| ⅜ | 95.9% |
| 4 | 88.8% |
| 8 | 84.1% |
| 20 | 72.2% |
| 24 | 66.8% |
| 30 | 63.7% |
| 50 | 34.6% |
| 100 | 20.4% |
| 200 | 13.8% |

The blended mixture was laid over a playing surface at the Sherwood Forest Elementary School of the Bellevue School District, Bellevue, Washington, to an average depth of 4 to 6 inches and rolled with a compactor after laying.

Experience with the playfield surface, as observed by parents and teachers, has been favorable, particularly with regard to the lack of abrasive material in the field, the resiliency of the field and the good traction the field provides for soccer and other athletics.

The playing surfaces mentioned in Examples I and II were examined after heavy snowfall and under freezing conditions. Heavy snowfall has two main problems associated with it — erosion and saturation during melting of the snow. The playing surfaces of Examples I and II containing the rubber particles helped to control erosion by forming miniature dams perpendicular to the direction of normal water flow. These seem to slow the runoff rate sufficiently that virtually no erosion was noted. Because of the drainage characteristics of the playing surfaces, percolation continued after saturation and the surface was set up and dirm and usable within two days after the thaw of a heavy snowfall.

Under freezing conditions, most surfaces become brick-like and water tends to saturate the surface. Any freezing noted on the playing surfaces of Examples I and II could be broken up by the mere weight of a person's stepping on it. The surface retained many of its desirable properties.

The embodiments of the invention in which a particular property or privilege is claimed are defined as follows:

1. A resilient, water pervious composition for playing surfaces and/or other utility areas, consisting of a mixture of particulate rubber and particulate inorganic solids, the particulate rubber being 10-50% by volume and having a particle size such that not more than 10% by volume passes a No. 100 sieve and substantially all passes a No. 8 sieve, the particulate inorganic solids being 90-50% by volume having a particle size such that 80-100% by volume passes a No. 8 sieve and not more than 15% by volume passes a No. 200 sieve.

2. The composition of claim 1 wherein the particulate rubber is from reclaimed vehicle tires, the particulate rubber constituting elongated fibers of a length ranging from ¼ to 3 inches and diameters from 1/16 to ⅛ inch.

3. A resilient, water pervious composition for playing surfaces and/or other utility areas consisting of a mixture of particulate rubber and inorganic particulate solids, the particulate rubber being 20-50% by volume having a particle size such that not more than 10% by volume passes a No. 100 sieve and the particulate inorganic solids being 80-50% by volume having a particle size such that 80-100% by volume passes a No. 8 sieve and not more than 15% by volume passes a No. 200 sieve.

4. The composition of claim 3, including the addition of 5-25% by volume organic particulate solids as a part of the 80-50% by volume inorganic particulate solids, the organic particulate solids selected from the group consisting of wood chips, peat and manure.

5. The composition of claim 4 wherein the particulate rubber is from reclaimed vehicle tires, the particulate rubber constituting elongated fibers of a length ranging from ¼ to 3 inches and diameters from 1/16 to ⅛ inch.

6. The composition of claim 3 wherein the particulate rubber is from reclaimed vehicle tires, the particulate rubber constituting elongated fibers of a length ranging from ¼ to 3 inches and diameters from 1/16 to ⅛ inch.

7. The composition of claim 1 including the addition of 5-25% by volume organic particulate solids as a part of the 90-50% by volume inorganic particulate solids, the organic particulate solids selected from the group consisting of wood chips, peat and manure.

* * * * *